June 15, 1948.  F. M. REID  2,443,478
VEHICLE BODY
Filed March 22, 1945  3 Sheets-Sheet 1
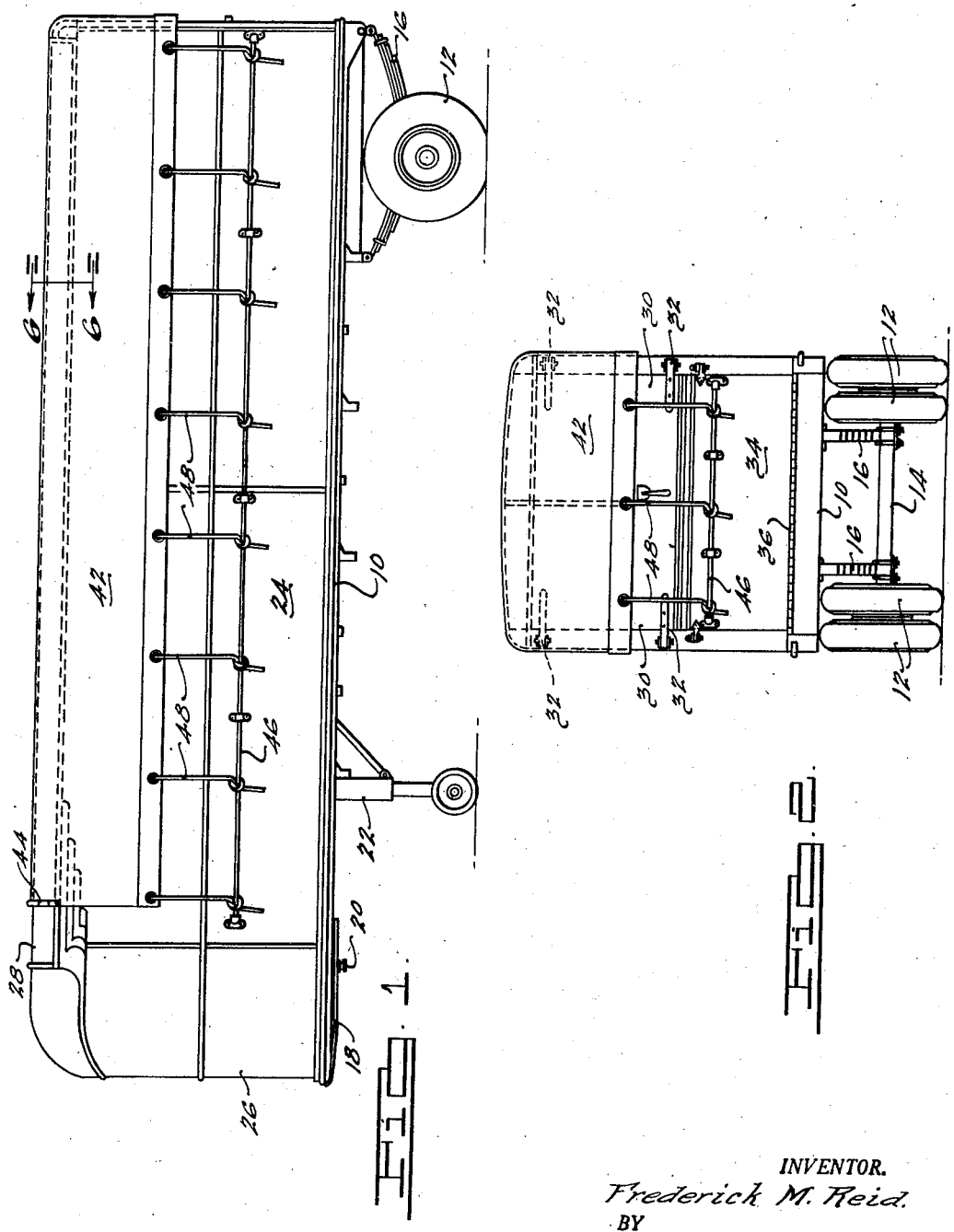
INVENTOR.
Frederick M. Reid.
BY
Harness, Dickey & Pierce.
ATTORNEYS.

June 15, 1948.
F. M. REID
2,443,478
VEHICLE BODY
Filed March 22, 1945
3 Sheets-Sheet 2
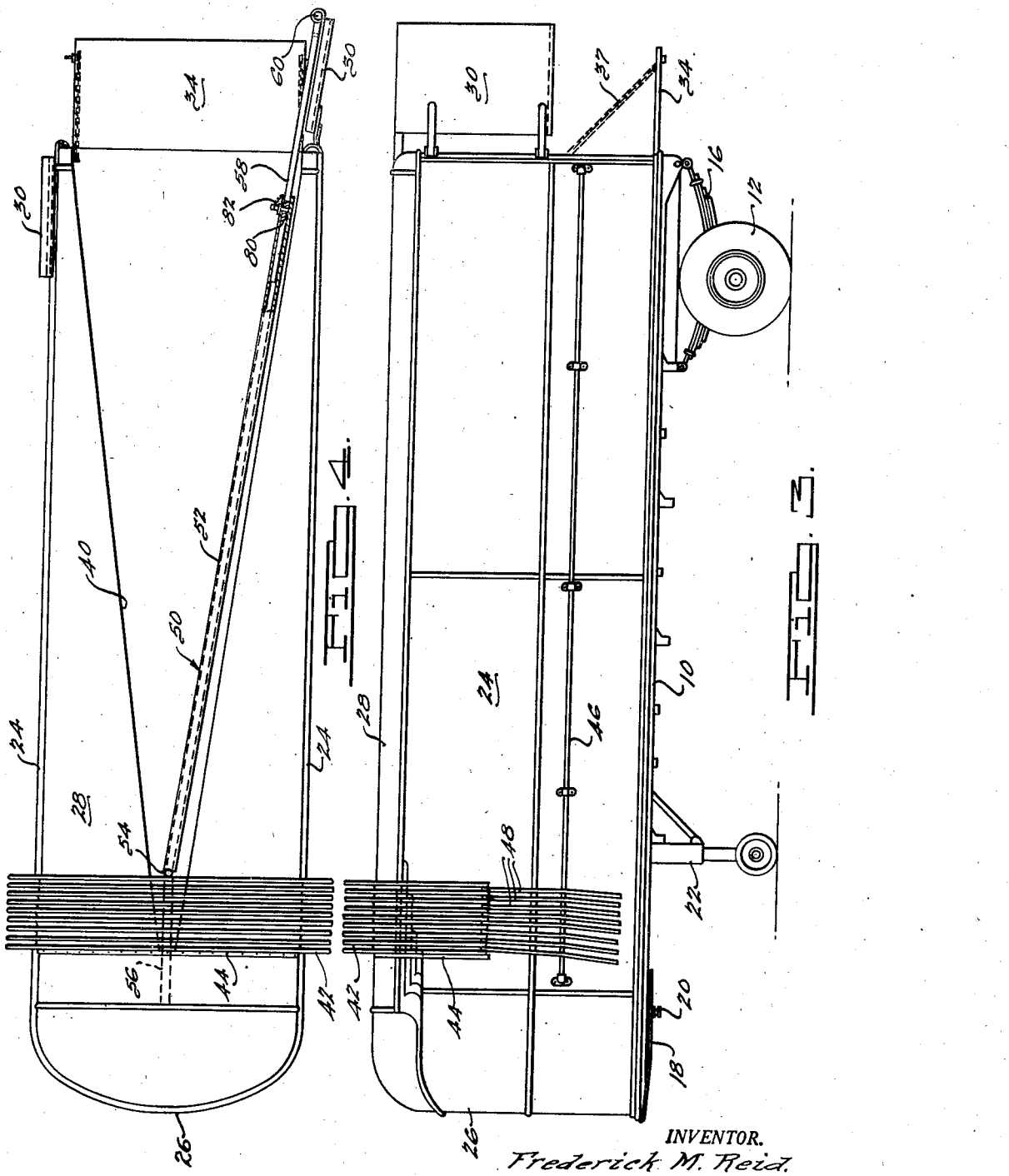
INVENTOR.
Frederick M. Reid.
BY
Harness, Dickey & Pierce.
ATTORNEYS.

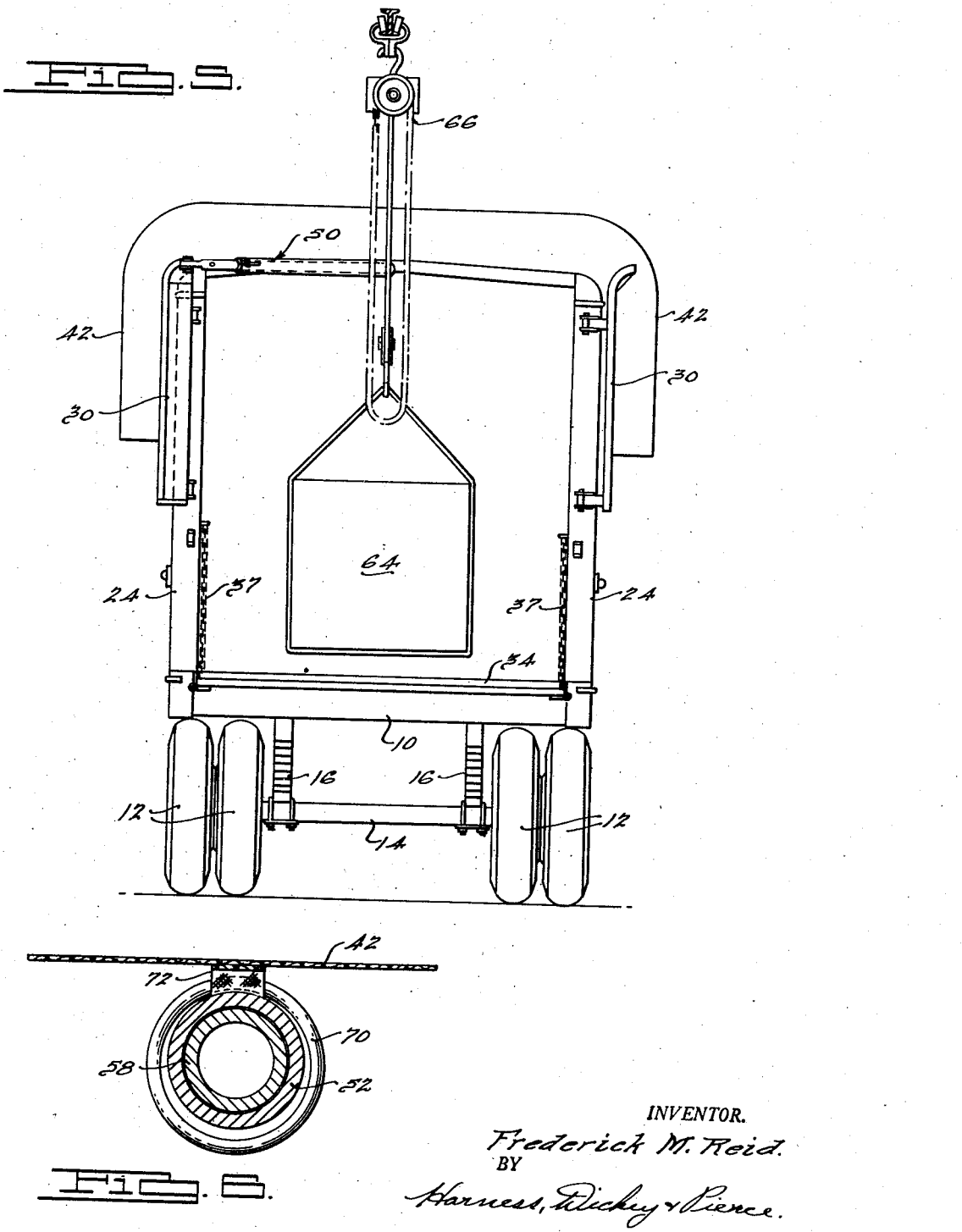

Patented June 15, 1948

2,443,478

UNITED STATES PATENT OFFICE 2,443,478

VEHICLE BODY

Frederick M. Reid, Detroit, Mich., assignor to Fruehauf Trailer Company, Detroit, Mich., a corporation of Michigan Application March 22, 1945, Serial No. 584,084

11 Claims. (Cl. 296—100)

This invention relates to vehicles of the load carrying type and particularly to those employing a tarpaulin for protecting its load against the weather, the principal object being the provision of a body construction for a vehicle of this type having important advantages as compared to conventional types of similar body constructions.

Objects of the invention include the provision of a vehicle body employing a tarpaulin for protecting the load carried thereby against the elements; the provision of a body of the class described employing a tarpaulin guide and support normally positioned centrally thereof and capable of being moved to one side of the center to permit a load to be applied to the vehicle or to be removed therefrom by a chain fall or other load manipulating device moving centrally of the body; the provision of a vehicle body construction including an elongated supporting and guiding member normally positioned above the floor thereof intermediate the sides thereof and extending longitudinally thereof, together with a tarpaulin centrally supported and guided thereby and capable of relative movement longitudinally thereof, means being provided for supporting the rear end of the longitudinally extending member so as to move it away from the central portion of the body thereby to free said central portion over the greater portion of its length for the free passage of load supporting means longitudinally of the body; and the provision of a construction as above described in which the body is provided with tail gate means serving to support the rear end of the longitudinally extending member and acting to swing the rear end of the longitudinally extending member laterally away from the central portion of the body when such closure means is swung to opened position.

Further objects of the invention include the provision of a vehicle body construction employing a tarpaulin to protect at least in part the load carried by the body from the effects of the weather, and in which the body is provided with permanent side and roof portions, the roof being provided with a central opening extending from the rear end thereof forwardly and which opening is normally closed by the tarpaulin; the provision of a tarpaulin type of vehicle load carrying body in which the area requiring protection by the tarpaulin is minimized by the provision of permanent side and roof portions cooperating with a tarpaulin to provide a complete enclosure for a load carried by the vehicle, the permanent side and roof sections forming at least in part a support for the tarpaulin; and the provision of a vehicle body of the type described in which the opening in the roof extends from the rear end of the body to a point adjacent the forward end thereof and is of generally V shape in plan view with the V-opening out through the rear end of the roof, the sides of the roof over the V being free of permanent connection with each other in the plane of the V.

Still further objects of the invention include the provision of a vehicle body having permanent side and roof sections, the roof section having an opening formed centrally therein extending from the rear edge of the roof to a point intermediate the length thereof, an elongated supporting member being swivably connected to the roof adjacent the forward end of such opening and being movably supported at its rear end so that such rear end is capable of swinging transversely with respect to the length of the body from such central position, a tarpaulin extending over at least that portion of the roof in which said opening is provided and being supported and guided upon said longitudinally extending member; the provision of a vehicle body as above described in which the rear end of the body is at least partially closed by a door upon which the rear end of the longitudinally extending member is supported; the provision of a construction as above described in which the longitudinally extending member is of telescopic construction and one end of one of the sections thereof is pivotally secured to said door whereby when said door is moved from closed to open position the longitudinally extending member is swung laterally away from the longitudinal center line of the opening in the roof thereof to render such openings free for the passage of load supporting means or mechanism; and the provision of a construction as above described in which a tarpaulin is provided in overlying relationship with respect to said opening in said roof and supported by said roof and said longitudinally extending member.

The above being among the objects of the present invention, the same consists in certain novel features of construction and combinations of parts to be hereinafter described with reference to the accompanying drawings, and then claimed, having the above and other objects in view.

In the accompanying drawings which illustrate a suitable embodiment of the present invention and in which like numerals refer to like parts throughout the several different views.

Fig. 1 is a side elevational view of a semi-trailer provided with a body constructed in accordance with the present invention and illustrating the same with a tarpaulin in the extended position which it assumes in transit;

Fig. 2 is a rear view of the semi-trailer shown in Fig. 1;

Fig. 3 is a view similar to Fig. 1 but illustrating the semi-trailer in the condition to which it is placed to receive or discharge a load, that is with the tarpaulin contracted and with the rear doors and tail gate open;

Fig. 4 is a plan view of the semi-trailer in the position shown in Fig. 3;

Fig. 5 is an enlarged rear view of the semi-trailer shown in the preceding views in the condition in which it is shown in Figs. 3 and 4; and Fig. 6 is an enlarged fragmentary, vertical sectional view taken transversely of the roof of the vehicle as on the line 6—6 of Fig. 1 to illustrate the means employed for guiding the tarpaulin in its movement longitudinally of the body.

The present invention is applicable to vehicles of the load carrying type whether of the self-propelled or of the full or semi-trailer type, the latter type of vehicle being illustrated in the accompanying drawings by way of illustration and not by way of limitation, its application to other types of vehicle bodies thus being made known to those skilled in the art.

There are in use today a relatively large number of load carrying vehicles which employ tarpaulins to protect their load from the weather. Such vehicles are preferably used where the load to be carried is relatively heavy and of such a nature that an undue amount of work would be required to move the load into and out of a permanently closed type of body. In such case by the use of a so-called tarpaulin type body the tarpaulin may be removed and a crane, chain falls, or the like may be employed to deposit the work directly upon the floor of the vehicle at the desired point after which the tarpaulin may be replaced to protect the load from the weather.

In the past these tarpaulin types of bodies have had many drawbacks particularly from the point of consuming an undue amount of time in the application and removal of the tarpaulin, and because of the inadequacy of the support afforded the tarpaulin particularly in stormy weather. In the past the tarpaulin has usually been supported by means of bows, the opposite sides of which have been supported in sockets either carried directly by the floor of the body or by solid or stake side walls carrying sockets for reception of the bows. In any case the supports for the bows have not been of the rigid character desired, the bows themselves often become lost because they are loose pieces and, additionally because there is no means of guiding the tarpaulin longitudinally over the bows it is difficult to apply and remove the tarpaulin. Additionally, because of the large unsupported area of the tarpaulin between the bows relatively large forces are required to be absorbed by the tarpaulin itself in storms often to the destruction of the tarpaulin.

In accordance with the present invention means are provided for supporting the tarpaulin centrally of the body and for guiding it in its movement between extended and contracted position. This feature not only provides an additional support for the tarpaulin but serves to anchor it against movement in stormy weather and also provides a means whereby the tarpaulin may be moved between its extended and its contracted position in a quick and easy manner. In order that this supporting and guiding means will not interfere with the free movement of a load to and from the vehicle body by means of a crane, chain hoist or other similar load supporting and moving means, the longitudinally extending guiding member is mounted so as to be readily moved out of interfering relation for loading unloading operations.

In the broader sense of the invention this longitudinally extending, supporting and guiding means for the tarpaulin may be employed regardless of the structure of the remaining portion of the vehicle body, but in accordance with a further feature of the present invention in order to give the required sufficiency of support to the tarpaulin the body is provided with permanent side and roof sections permanently and rigidly secured together instead of the usual bows conventionally provided for supporting tarpaulins in this type of vehicle. In other words, the vehicle body may be substantially identical to the usual closed type of body having permanent sides and permanently connected roof with the exception that in accordance with this phase of the invention the roof is provided with a longitudinally extending opening or notch therein, preferably positioned centrally thereof, and extending from the rear edge of the roof to a point intermediate the length of the body or, if desired, completely to the front wall of the body. This opening or notch in the roof permits chain fall or other load supporting member to move freely therethrough so as to permit a load to be applied to the vehicle or removed therefrom substantially as freely as though the vehicle had no roof at all. However, in this case the actual space left in the roof required to be covered by the tarpaulin is but a fraction of the space required in conventional constructions to be covered by the tarpaulin and at the same time the side and roof sections of the vehicle body provide an extended and rigid support for the tarpaulin, thus eliminating the major disadvantages of conventional types of constructions.

It will be appreciated that where the supporting and guiding means for the tarpaulin first described is combined with the type of body construction last described the maximum benefits of both constructions is realized, and at the same time means may be provided whereby the rear end of the tarpaulin supporting and guiding means may be automatically moved into and out of operative relation simply by the opening and closing of the doors for the rear end of the vehicle body. In such case the longitudinally extending tarpaulin supporting and guiding means may be formed of telescopic sections and the forward end thereof may be swivably or pivotally supported by the permanent roof section at or adjacent the forward end of the notch in the roof. In such case the rear telescopic section may be pivotally secured to and supported by a transversely opening door for the rear end of the vehicle body so that the act of opening the door will automatically swing the longitudinally extending tarpaulin guiding and supporting member to one side of the longitudinal center line of such opening, thus to free the latter for unrestricted passage of the chain falls or the like therethrough, and upon closing the door the longitudinally extending tarpaulin supporting and guiding member will automatically be returned to its operative central position whereupon the tarpaulin may be readily extended to its closed operative position.

Referring now to the accompanying drawings it will be noted that the semi-trailer type of vehicle there shown includes what may be considered as combined frame and floor section indicated generally at 10 the rear end of which is supported by wheels 12 carried by an axle 14 connected to the rear end of the floor 10 by means of conventional semi-eliptic springs 16. As in conventional semi-trailer constructions the forward end of the semi-trailer is provided on its under face with a fifth wheel member 18 provided with a downwardly projecting kingpin 20 adapted to be received by and secured to the usual fifth wheel structure carried by a suitable or conventional tractor vehicle, not shown. When the forward end of the semi-trailer is not being actively supported by a tractor vehicle then it may be supported by a conventional supporting leg structure illustrated generally at 22 in a conventional manner as shown.

In accordance with the present invention the semi-trailer shown is provided with side walls 24, a front wall 26, and a roof 28, all rigidly fixed with respect to each other and to the floor 10. The side, front and roof sections 24, 26 and 28, respectively, may be of any suitable or conventional construction and may be so rigidly fixed with respect to each other and to the floor 10 as to provide major stress resisting elements for the body structure as a whole. The rear end of the body may be provided with any suitable type of conventional closure means in accordance with the broader aspects of the present invention but in accordance with a more limited phase of the invention includes a pair of doors 30 closing the upper portion of the rear end of the body, such doors being supported from the sides 24 by means of hinges 32 arranged with their pivotal axes vertical as shown. The lower portion of the rear open end of the body may be closed as by means of a conventional tail gate 34 supported at its lower edge by means of a piano type hinge 36 arranged with its axis horizontal as shown. Conventional chains such as 37 may be employed for supporting the free edge of the tail gate 34 when the latter is in open position as shown in Fig. 3. In the particular case shown the doors 30 and tail gate 34 when closed cooperate to provide a complete closure for the rear end of the body.

The body as thus described may be conventional in every respect except for the one feature of the present invention, namely that the roof is provided with a longitudinally extending opening or notch 40 therein preferably positioned centrally thereof and extending from the rear edge of the roof 28 to a point forwardly therefrom. The opening 40 may extend clear to the front wall 26 but preferably terminates at a point within the forward third of the length of the vehicle body so that a substantial portion of the roof 28 is continuous across the forward portion of the body to provide added rigidity therefor. In the broader aspects of the invention the particular conformation of the opening, or as it may be termed "notch," 40 in plan view is more or less unimportant as long as it is of sufficient width to permit the free passage of a chain fall or other load supporting elements freely therethrough from the rear end of the body to or adjacent the forward end of the notch 40. However, where the specific form of longitudinally extending tarpaulin supporting and guiding element is employed as hereinafter described, then the opening 40 is in the shape of a V-like notch with the apex thereof at the forward end of the body as shown, as in such case a maximum area of the roof 28 is preserved for rigidity and tarpaulin supporting purposes.

With the vehicle body thus described a tarpaulin such as 42 may be employed in connection therewith. The forward edge of the tarpaulin 42 is preferably, as brought out in Figs. 1 to 4, inclusive, permanently secured to the sides 24 and roof 28 adjacent the forward end of the notch 40 by being clamped against such sides and roof by means of a clamping strip 44 fixed to such sides and roof at this point. In this case the tarpaulin 42 is preferably extended part way down the sides 24 and tie rails 46 are provided along each side 24 so that the ties 48 secured at spaced intervals along the side edges of the tarpaulin 42 may be secured thereto during transit. The clamping strip 44 is preferably formed to intercept rain tending to flow rearwardly along the roof 28 and to drain it down the side walls 24.

It will be understood from the above that when the vehicle body is in transit the tarpaulin 42 is extended longitudinally of the body as illustrated in Figs. 1 and 2 so as to completely cover the notch 40 and it is preferably extended over the upper portions of the doors 30 at the rear end of the body as illustrated in Fig. 2. The lower free edges of the tarpaulin are secured by the ties 48 to the tie rails 46 to securely hold the tarpaulin in place, and the forward edge of the tarpaulin is securely held by the clamping strip 44 as previously described. In such case it will be appreciated that the sections of the roof 28 on either side of the notch 40, and the sides 24 provide a rigid and extended support for the tarpaulin 42 and that the tarpaulin is required to be effective only over the area of the notch 40 which is but a fragment of the area required to be enclosed by a tarpaulin in conventional constructions. It will be appreciated that in such case the tarpaulin is provided with a maximum amount of support which is of a rigid character, there is little possibility of the wind getting a material hold on the tarpaulin tending to tear it from the body, and that, therefore, a maximum amount of protection is afforded. At the same time it is possible to apply and remove loads to and from the body, respectively, with substantially as much ease as in conventional constructions and yet it is possible to manipulate the tarpaulin in a considerably shorter time inasmuch as it is not necessary to apply and remove bows, and the tarpaulin support is constantly present and in fully operative condition.

The support of the tarpaulin 42 is enhanced and its ease of manipulation materially increased by a further phase of the present invention. This comprises a longitudinally extending tarpaulin supporting and guiding device indicated generally at 50. In the form shown it comprises an elongated tube 52 swivably and preferably universally mounted as at 54 at its forward end in fixed relation with respect to the roof 28, in the particular case shown by means of a member 56 suitably rigidly secured to the roof and extending into the forward end of the notch or opening 40 on the longitudinal center line thereof. Telescopically received within the rear end of the tube 52 is a tube 58 the rear end of which is pivotally mounted as by a suitable hinge joint or pin 60 at the upper edge of one of the doors 30 and at the free edge of such door. The doors 30 being of equal width it will be appreciated that when the door to which the tube 58 is connected is in closed position both the tubes 58 and 52 will be located on the longitudinal center line of the vehicle, and where the upper edges of the doors 30 are on a line with the continuation of the roof 28 as will usually be preferably, will be in the plane of the central portion of the roof 28. Likewise it will be appreciated that when the door to which the tube 58 is connected is swung from its closed to its open position the elongated supporting device 50 will be swung from a position intermediate the sides of the opening or notch 40 to a position at one side thereof and when in the latter position will leave the opening 40 substantially free for the passage of a chain hoist or the like therethrough in the manner illustrated in Fig. 5. Where the load is of sufficiently small dimensions it may be lowered directly through the notch 40, and where too big for this a chain hoist or the like may be moved longitudinally of the body through the notch 40 to introduce a load such as 64 into the body or to remove such load therefrom.

Under the last-mentioned conditions it is, of course, assumed that the tarpaulin 42 will have been drawn to the forward end of the body as illustrated in Figs. 3 and 4 to uncover the opening or notch 40 and to facilitate the movement of the tarpaulin in this respect as well as to provide an additional support therefor intermediate the width of the slot 40 when the tarpaulin is in extended position, the tarpaulin, as brought out in Fig. 6, at spaced intervals over its length and along its center line has secured thereto rings 70 surrounding the tube 52 and of a size sufficiently larger than the tube 52 to be readily slidable thereover. The rings 70 may be connected to the tarpaulin in any suitable means such as, for instance, by a piece of webbing 72 sewn into a loop embracing the rings 70 and having its free ends sewed to the tarpaulin 42 as shown.

With this last-mentioned construction it will be appreciated that when the parts are in the relation shown in Figs. 3 and 4 and a load has been applied to or removed from the body as by means of a chain hoist such as 66 extending through the notch or opening 40, and it is desired to close the body as, for instance, to protect the load such as 64 deposited therein against the weather during transport, the tail gate 34 and the doors 30 are closed, this automatically positioning the supporting device 50 centrally of the opening 40, upon which the rear edges of the tarpaulin 42 are grasped and pulled rearwardly, the tarpaulin during such movement being guided by the device 50 in its rearward movement and, of course, being supported by the sections of the roof 28 and the upper portions of the sides 24. The tarpaulin having been moved to its fully extended position the ties 48 are then secured to the tie rails 46 and the vehicle is completely closed in load protecting relation and ready for transport. The reverse of these operations are carried out as will be obvious when it is desired to open up the body in order to remove a load therefrom.

It may be noted that as a matter of convenience in maintaining the door 30 which supports the rear end of the tube 38 in fully open position during loading or unloading operations, a pin such as 80 illustrated in Fig. 4 may be projected through matching holes in the tubes 52 and 58 thus to releasably lock the support 50 against extension or contraction. Preferably the pin 80 is permanently fastened to the rear end of the tube 52 by means of a chain 82 so that it may not become lost or displaced and will be constantly available.

Having thus described my invention, what I claim by Letters Patent is:

1. In a load carrying vehicle, in combination, a floor, side and front walls permanently and rigidly secured to said floor, a roof structure permanently and rigidly secured to the upper edges of said side and front walls, said roof structure having a notch therein extending from the rear edge thereof to a point at least beyond the midpoint of the length of said roof, a pair of half doors cooperating to close at least a portion of the rear end of said body and extending upwardly to approximately the plane of said roof structure, a pair of telescoping tubes the forward end of one of which is swivably supported by said body adjacent the forward end of said notch and the rear end of the other of which is pivotally connected to one of said half doors adjacent the upper edge thereof and at the free edge thereof whereby when said half doors are closed said telescoping tubes are positioned substantially on the longitudinal center line of said body and when said half doors are open said tubes are principally positioned to one side of the longitudinal center line of said notch, a tarpaulin overlying said roof structure and adapted when extended to overlie and close said notch, said tarpaulin being supported by said roof structure on either side of said notch and by said telescoping tubes and having guiding rings secured thereto and slidably embracing at least one of said telescoping tubes, and means for removably securing the free side marginal edges of said tarpaulin with respect to said side walls.

2. In a vehicle body of the load carrying type, in combination, a floor, side and front walls rigidly fixed with respect to each other and to said floor, a roof structure rigidly and permanently secured to the upper edges of said side and end wall, said roof structure being centrally provided with a substantially pointed notch opening through the rear end thereof and extending longitudinally thereof over at least half the length of said roof, said notch decreasing in width from the rear end of said body toward the front end thereof, said roof structure being free of transverse connections within the area of said notch whereby to provide a space for the free passage of load supporting means therethrough, and a tarpaulin overlying said roof structure over the length of said notch therein and being longitudinally contractible to expose said notch for loading and unloading purposes.

3. In a vehicle body of the load carrying type, in combination, a floor, side and front walls rigidly fixed with respect to each other and to said floor, a roof structure rigidly and permanently secured to the upper edges of said side and end wall, said roof structure being centrally provided with a substantially pointed notch opening through the rear end thereof and extending longitudinally thereof over at least half the length of said roof, said notch decreasing in width from the rear end of said body toward the front end thereof, said roof structure being free of transverse connections within the area of said notch whereby to provide a space for the free passage of load supporting means therethrough, openable closure means for closing the rear end of said body, and a tarpaulin overlying said roof structure over the length of said notch therein and being longitudinally contractible to expose said notch for loading and unloading purposes.

4. In a vehicle body of the load carrying type, in combination, a floor, side and front walls rigidly fixed with respect to each other and to said floor, a roof structure rigidly and permanently secured to the upper edges of said side and end wall, said roof structure being centrally provided with a notch opening through the rear end thereof and extending longitudinally thereof over at least half the length of said roof, said notch being of maximum width at the rear end of said roof and being substantially pointed at its forward end, said roof structure being free of transverse connections within the area of said notch whereby to provide a space for the free passage of load supporting means therethrough, and a tarpaulin overlying said roof structure over the length of said notch therein and being longitudinally contractible to expose said notch for loading and unloading purposes.

5. In a vehicle body, in combination, a floor, a substantially straight elongated member supported in spaced relation above and in generally parallel relation with respect to said floor, means providing a swivable support for the forward end of said member in fixed relation with respect to said floor and in substantially a horizontal plane including the axis of said member, means for supporting the rear end of said member for movement laterally with respect to said floor, a tarpaulin overlying said member, means cooperating between said tarpaulin and said member for guiding said tarpaulin longitudinally of said member, and means for optionally locating the rear end of said member either centrally of the width of said vehicle or to one side of the center thereof.

6. In a load carrying vehicle, in combination, a floor, sides secured to the opposite marginal side portions of said floor, an extensible and contractible tarpaulin extending over the upper edges of said sides, and means for supporting the central portion of said tarpaulin and guiding it in its expansible and contractible movements comprising an elongated substantially straight member positioned approximately on a level with the upper edges of said sides and oscillatably mounted at its forward end at said level in fixed relation with respect to said sides and extending rearwardly therefrom, said tarpaulin overlying said elongated member, means connected to said tarpaulin and slidably engaging said elongated member for movement longitudinally thereof, and means for movably mounting the rear end of said elongated member for movement laterally of said floor and sides whereby said elongated member may be positioned approximately on the longitudinal center line of said vehicle or positioned principally to one side thereof.

7. In a load carrying vehicle, in combination, a floor, side and front walls permanently and rigidly secured to each other and to said floor, a roof permanently and rigidly secured to said side and front walls, said roof having a notch therein extending from the rear edge of said roof to a point forwardly of the transverse center line thereof and disposed approximately on the longitudinal center line of said vehicle, a tarpaulin support lying in the general plane of said notch and mounted for oscillatory movement in said plane about a vertical axis adjacent the forward end of said notch, means for supporting the rear end of said elongated support for movement transversely of the width of said body and in a position either approximately on the longitudinal center line of said body or in a position laterally offset therefrom, a tarpaulin extending over said roof over the length of said notch therein and extending part way down said side walls, and a plurality of guiding devices secured to said tarpaulin in spaced relation with respect to each other longitudinally thereof and slidably engaging said supporting and guiding member, said tarpaulin being contractible to expose substantially the full area of said notch in said roof structure.

8. In a load carrying vehicle, in combination, a floor, side and front walls permanently and rigidly secured to each other and to said floor, a roof permanently and rigidly secured to said side and front walls, said roof having a notch therein extending from the rear edge of said roof to a point forwardly of the transverse center line thereof and disposed approximately on the longitudinal center line of said vehicle, a tarpaulin support lying in the general plane of said notch and mounted for oscillatory movement in said plane about a vertical axis adjacent the forward end of said notch, means for supporting the rear end of said elongated support for movement transversely of the width of said body and in a position either approximately on the longitudinal center line of said body or in a position laterally offset therefrom, a tarpaulin extending over said roof over the length of said notch therein and extending part way down said side walls, means fixing the forward end of said tarpaulin to said roof structure adjacent the forward end of said notch therein, and a plurality of guiding devices secured to said tarpaulin in spaced relation with respect to each other longitudinally thereof and slidably engaging said supporting and guiding member, said tarpaulin being contractible to expose substantially the full area of said notch in said roof structure.

9. In a load carrying vehicle, in combination, a floor, side and front walls permanently and rigidly secured to said floor, a roof structure permanently and rigidly secured to the upper edges of said side and front walls, said roof structure having a notch therein extending from the rear edge thereof to a point at least beyond the midpoint of the length of said roof, a pair of half doors cooperating to close at least a portion of the rear end of said body and extending upwardly to approximately the plane of said roof structure, a pair of telescoping tubes the forward end of one of which is swivably supported by said body adjacent the forward end of said notch and the rear end of the other of which is pivotally connected to one of said half doors adjacent the upper edge thereof and at the free edge thereof whereby when said half doors are closed said telescoping tubes are positioned substantially on the longitudinal center line of said body and when said half doors are open said tubes are principally positioned to one side of the longitudinal center line of said notch, and a tarpaulin overlying said roof structure and adapted when extended to overlie and close said notch, said tarpaulin being supported by said roof structure on either side of said notch and by said telescoping tubes, and having guiding rings secured thereto and slidably embracing at least one of said telescoping tubes.

10. In a vehicle body of the load carrying type, in combination, a floor, side and front walls rigidly fixed with respect to each other and to said floor, a roof structure rigidly and permanently secured to the upper edges of said side and end wall, said roof structure being centrally provided with a V-shaped notch opening through the rear end thereof and extending longitudinally thereof over at least half the length of said roof, the side edges of said notch being disposed at a material angle with respect to each other and to the planes of said side walls, said roof structure being free of transverse connections within the area of said notch whereby to provide a space for the free passage of load supporting means therethrough, and the assembly of said roof structure and side walls progressively increasing in rigidity from the rear end of said body to the front end of said notch.

11. In a load carrying vehicle, in combination, a floor, side and front walls permanently and rigidly secured to said floor, a roof structure permanently and rigidly secured to the upper edges of said side and front walls, said roof structure having a notch therein extending from the rear edge thereof to a point at least beyond the midpoint of the length of said roof, a pair of half doors cooperating to close at least a portion of the rear end of said body and extending upwardly to approximately the plane of said roof structure, a pair of telescoping tubes the forward end of one of which is swivably supported by said body adjacent the forward end of said notch and the rear end of the other of which is pivotally connected to one of said half doors adjacent the upper edge thereof and at the free edge thereof whereby when said half doors are closed said telescoping tubes are positioned substantially on the longitudinal center line of said body and when said half doors are open said tubes are principally positioned to one side of the longitudinal center line of said notch, and a tarpaulin overlying said roof structure and adapted when extended to overlie and close said notch, said tarpaulin being supported by said roof structure on either side of said notch and by said telescoping tubes.

FREDERICK M. REID.

REFERENCES CITED

The following references are of record in the file of this patent:

UNITED STATES PATENTS

| Number | Name | Date |
|---|---|---|
| 1,729,555 | Sparshatt | Sept. 24, 1929 |
| 2,074,358 | Bixel et al. | Mar. 23, 1937 |
| 2,245,832 | Simpson | June 17, 1941 |

FOREIGN PATENTS

| Number | Country | Date |
|---|---|---|
| 11,564 | Great Britain | June 6, 1901 |
| 159,303 | Great Britain | Feb. 22, 1921 |

Certificate of Correction

Patent No. 2,443,478.   FREDERICK M. REID   June 15, 1948.

It is hereby certified that errors appear in the printed specification of the above numbered patent requiring correction as follows: Column 4, line 10, after the word "loading" insert *and*; column 7, line 6, for "preferably" read *preferable*; and that the said Letters Patent should be read with these corrections therein that the same may conform to the record of the case in the Patent Office.

Signed and sealed this 17th day of August, A. D. 1948.

[SEAL]

THOMAS F. MURPHY,
*Assistant Commissioner of Patents.*